(12) United States Patent
Hausmann et al.

(10) Patent No.: US 8,399,531 B2
(45) Date of Patent: Mar. 19, 2013

(54) FOAMABLE COMPOSITION

(75) Inventors: Karlheinz Hausmann, Auvernier (CH); Yefim Brun, Wilmington, DE (US); Joerg Wallach, Wachtendonk (DE)

(73) Assignees: C H Erbsloh KG (DE); E I du Pont de Nemours and Company, Wilmington, DE (US)

( * ) Notice: Subject to any disclaimer, the term of this patent is extended or adjusted under 35 U.S.C. 154(b) by 257 days.

(21) Appl. No.: 11/238,796

(22) Filed: Sep. 29, 2005

(65) Prior Publication Data
US 2006/0100297 A1    May 11, 2006

Related U.S. Application Data

(60) Provisional application No. 60/614,168, filed on Sep. 29, 2004.

(51) Int. Cl.
| | |
|---|---|
| C08J 9/06 | (2006.01) |
| C08J 9/04 | (2006.01) |
| B29C 44/38 | (2006.01) |
| C08F 290/14 | (2006.01) |
| C08L 33/02 | (2006.01) |

(52) U.S. Cl. ........ 521/140; 521/134; 521/142; 521/149; 521/189; 521/50; 525/50; 525/78; 525/191

(58) Field of Classification Search ............... 521/134, 521/50, 140, 142, 149, 189; 525/50, 78, 525/191
See application file for complete search history.

(56) References Cited

U.S. PATENT DOCUMENTS

| | | | |
|---|---|---|---|
| 2,953,551 A | 9/1960 | White | |
| 4,480,054 A * | 10/1984 | Enderle | 521/84.1 |
| 5,266,133 A | 11/1993 | Hanley et al. | |
| 5,373,027 A | 12/1994 | Hanley et al. | |
| 2003/0034723 A1 | 2/2003 | Mehan et al. | |
| 2004/0157964 A1 | 8/2004 | Aoki et al. | |
| 2005/0288440 A1* | 12/2005 | Chou et al. | 525/191 |
| 2005/0288442 A1* | 12/2005 | Chou et al. | 525/199 |
| 2006/0264549 A1* | 11/2006 | Rolland | 524/425 |
| 2009/0123689 A1* | 5/2009 | Visioli et al. | 428/95 |

FOREIGN PATENT DOCUMENTS

| | | |
|---|---|---|
| EP | 0 383 498 B1 | 3/1993 |
| JP | 63179739 A | 7/1988 |
| JP | 6200067 A | 7/1994 |
| JP | 9169876 A | 6/1997 |

OTHER PUBLICATIONS

Hausmann et al.,"Modifier offers low cost alternative for platics," Plastics, Additives, and Compounding, vol. 4, Issue 3, Mar. 2002, pp. 18-19.*
Y. Brun et al., (Y. Brun, J. Liq. Chrom. & Rel. Technol., 22, 3067-3090, (1999).
PCT International Search Report for International Application No. PCT/US2005/035078 dated Mar. 16, 2006.

(Continued)

*Primary Examiner* — Michael Pepitone

(57) ABSTRACT

A foamable composition comprises at least about 50 wt % of a copolymer of ethylene and alkyl (meth)acrylate having a broad chemical composition distribution (CCD), and having a melt index between about 7 and about 30; about 2 to about 40 wt % of a polyolefin having a carboxylic acid or carboxylic acid anhydride functionality; about 1 to about 10 wt % of one or more foaming agents; and about 1 to about 5 wt % of one or more crosslinking agents. This foamable composition combines ease of processing with good foaming characteristics while avoiding unwanted characteristics, such as fogging.

15 Claims, 2 Drawing Sheets

OTHER PUBLICATIONS

Encyclopedia of Polymer Science and Engineering, 2nd Edition, (vol. 6), pp. 383, 403-406, 409 (1986).

K. Hausmann, Additives with Dual Function Acrylate Ester Copolymers As Modifiers for Engineering Polymers and as Carrier Resin for Masterbatches, Presentation from Addcon in Budapest, 2002, pp. 1-38.

Chou, R. T., Keating, M. Y., Hughes, L. J., High Flexibility EMA Made From High Pressure Tubular Process, ANTEC 2002, pp. 1832-1836.

Chou, R. T., Brun, Y., Pottiger, M. T., Compositional Heterogeneity of Ethylene-Acrylate Copolymers Effect on Melt Rheology, ANTEC 2004, vol. II, pp. 1851-1855.

* cited by examiner

FOAMABLE COMPOSITION

CROSS-REFERENCE TO RELATED APPLICATION

The present application claims priority under 35 U.S.C. §120 to U.S. Provisional Appln. No. 60/614,168, filed on Sep. 29, 2004, which is incorporated herein by reference in its entirety.

BACKGROUND OF THE INVENTION

1. Field of the Invention

The invention relates to foamable compositions, and, in particular, to compositions that are foamable in situ, for example in elongated hollow cavities such as the interior of car pillars, to produce a foam that adheres to the pillar's walls and provides a barrier to sound and/or moisture.

2. Description of the Related Art

One or more patents and publications are cited in this description in order to more fully describe the state of the art to which this invention pertains. The entire disclosure of each of these patents and publications is incorporated by reference herein.

In the fabrication of automobiles, trucks and similar over-the-road vehicles, many body components have cavities that require sealing to prevent corrosion of the body parts due to ingress of moisture and contaminants. This is especially true with respect to unibody structures in which a heavy solid frame is replaced with a space frame that is hollow or partially hollow. Cavities in vehicle frames also serve as passages that transmit sounds during normal use of the vehicle. For example, the upright post structure of a vehicle's body that defines a portion of the door opening presents an elongated passage or cavity that can collect moisture and contaminants and also transmit annoying sounds unless the passage or cavity is at least partially filled with a sealant material that blocks entrance of moisture and debris, and that also serves as a baffle for muting sounds. There are other articles, for example, marine vehicles, stationary machinery and buildings, that have cavities that may preferably be sealed for similar reasons or by similar means.

Many attempts have been made to seal these cavities, including spraying sealant into the cavity, introducing foam products or fiberglass matting into the cavity, and the like. These efforts have not been entirely satisfactory because of the inefficiency of the sealing and baffling methods, unsatisfactory performance of the sealing and baffling materials, or the relatively high cost of the process and materials.

Foaming in place has not been totally satisfactory because of the difficulty in controlling the placement of the foam or its precursor. In addition, an excess of the foam or its precursor is usually introduced into the body cavity. This strategy ensures that the cavity is filled and sealed; however, it also introduces an economic inefficiency. Furthermore, many foams and foam precursors include crosslinkers that are reacting during the filling process. Thus, even when processing conditions are carefully controlled, there is a time limit during which the cavity can be filled before the foam becomes rigid. In addition, foams often do not adhere to the interior surface of the cavity if it is contaminated, for example with oil. In addition, some foams or foamable products are tacky and thus cannot be easily placed in the required position. Also, certain foams and precursors deform or degrade at the elevated temperature conditions to which a vehicle body may be subjected during fabrication, which may lead to a reduction in sealing and sound attenuating properties.

Nevertheless, foaming in place has generated some scientific and commercial interest. For example, European Patent No. 0 383 498 A relates to shaped, foamable parts comprising a composition of at least 65 wt % of a base polymer containing units derived from ethylene and an olefinically unsaturated methyl acrylate having a melt index (MI) of from 0.1 to 6 and containing from 10 to 40 wt % of methyl acrylate and a cross linking agent, a chemical blowing agent and a blowing agent activator so that the part is foamable and curable concurrently at a temperature between 110-190° C. and gives a closed cell foam. The preferred MI values to achieve good foamability are between 0.2 and 1. The disclosed base polymer has a broad molecular weight distribution to provide melt strength, necessary for foaming.

In addition, U.S. Pat. Nos. 5,266,133 and 5,373,027 describe a base polymer comprising an ethylene-$\alpha,\beta$-ethylenically unsaturated carboxylic acid copolymer ionomer whose ionic bonds are believed to encourage foaming expansion in a fairly narrow temperature range. Such ionomers are significantly more expensive than ethylene/methyl acrylate copolymers, however, which is a serious drawback for the contemplated applications.

Moreover, foamable compositions typically include plasticizers such as diethylene glycol, in order to improve the processing of the foamable composition. High viscosity at a low shear rate is needed for good foamability; often, this is achieved by selecting a base polymer with a low melt index, which encourages the formation of smaller and more uniform bubbles. The low melt index, however, makes it necessary to use a plasticizer to avoid overheating during processing. Overheating may lead to premature activation of the foaming or blowing agent. Diethylene glycol, a common plasticizer, is also said to improve adhesion. When a plasticized composition is foamed in the pillar of a car, however, and the car is exposed to high temperatures, plasticizers such as diethylene glycol often sublimate onto the windshield as a greasy deposit. This effect, which is called "fogging", is undesirable to manufacturers and consumers alike.

There is therefore a need for a foamable composition, made of economically efficient materials, that combines ease of processing with good foaming characteristics while avoiding unwanted side effects such as fogging.

SUMMARY OF THE INVENTION

In order to achieve one or more of these objectives, the present invention provides a foamable composition that comprises at least about 50 wt % of a copolymer of ethylene and alkyl (meth)acrylate; about 2 to about 40 wt % of a polyolefin having a carboxylic acid or carboxylic acid anhydride functionality; about 1 to about 10 wt % of one or more foaming agents; and about 1 to about 5 wt % of one or more crosslinking agents. The ethylene/alkyl (meth)acrylate copolymer has a broad chemical composition distribution (CCD), preferably with a standard deviation $\sigma > 0.1$ as determined by interaction polymer chromatography (IPC). The ethylene/alkyl (meth)acrylate copolymer also has a melt index between about 7 and about 30, as measured at 190° C./2.16 kg according to ASTM D1238.

In addition to the foamable composition itself, the invention also provides an article comprising the foamable composition of the invention or a foam obtainable by foaming the composition of the invention. Examples of articles of the invention include a non-foamable support carrying a foamable part comprising the composition of the invention, and a hollow substrate, which may be a car pillar, containing a foam obtainable by foaming the composition of the invention. The hollow substrate may be substantially filled by the foam. Alternatively, the foam may form a "plug" that fills or seals an opening in the hollow substrate, and only a relatively small amount of the foam may extend inside the cavity.

DETAILED DESCRIPTION OF THE INVENTION

Figure 1:
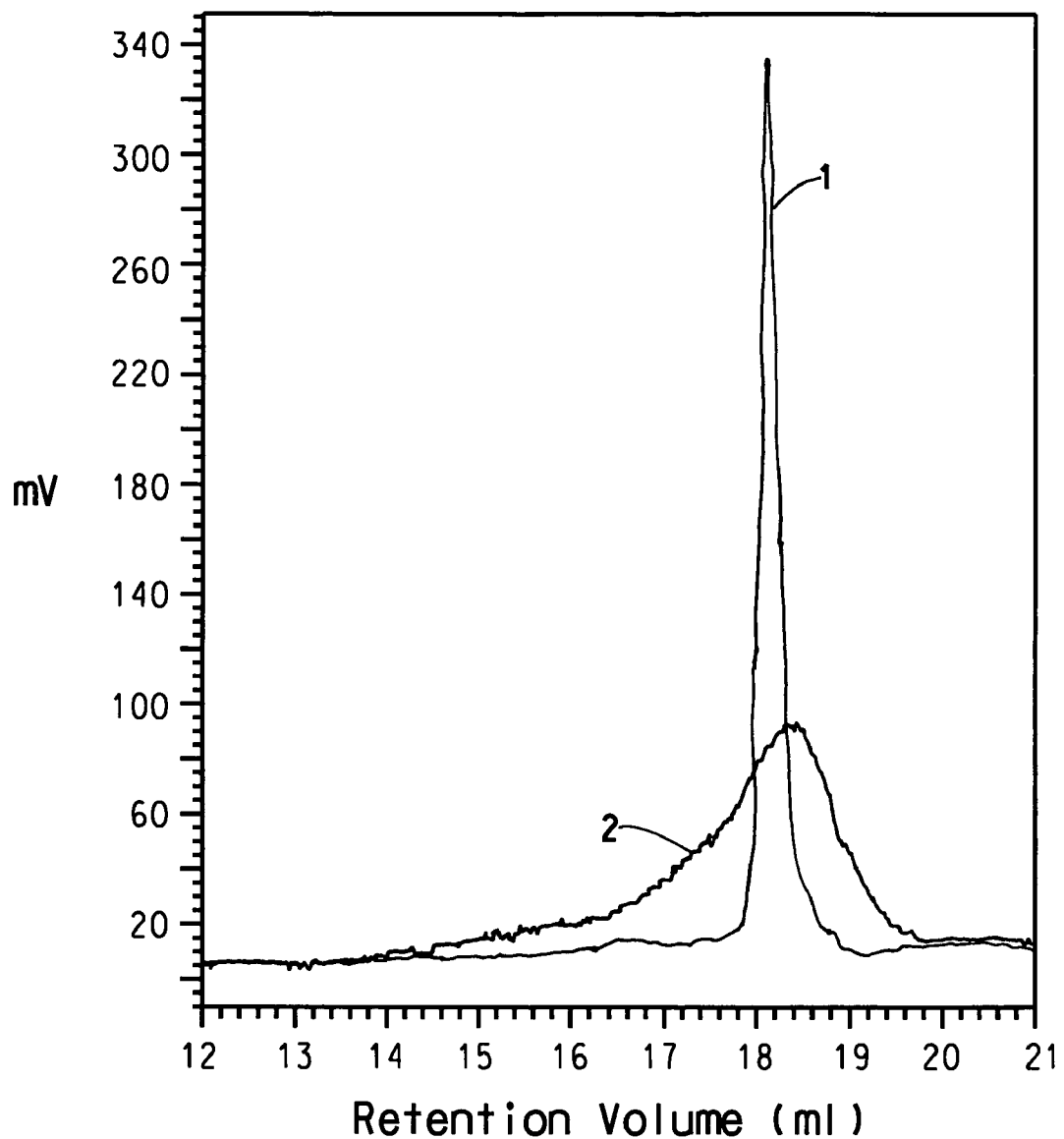
FIG. 1 is a graph illustrating the elution profiles by interaction polymer chromatography (IPC) fractionation of two grades of ethylene methyl acrylate (EMA) copolymers.

The following definitions apply to the terms as used throughout this specification, unless otherwise limited in specific instances.

The term "(meth)acrylic", as used herein, alone or in derivative form, is shorthand notation for compounds having either acrylic functionality, methacrylic functionality or a mixture comprising compounds of both types, and generally indicates that either or both types are used or can be useful. For example, "alkyl (meth)acrylate" as used herein generically refers to an alkyl acrylate, an alkyl methacrylate, or to a mixture thereof.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The foamable composition of the invention comprises at least one copolymer of ethylene and an alkyl (meth)acrylate (E/AA). The alkyl group of the alkyl (meth)acrylate may be a straight chain or branched alkyl group having from one to eight carbon atoms. Preferred alkyl groups include, without limitation, methyl, ethyl, and n-butyl groups. Preferred copolymers of ethylene and alkyl (meth)acrylate include, without limitation, ethylene-methyl acrylate copolymer (EMA), ethylene-butyl acrylate copolymer (EBA), and ethylene-ethyl acrylate copolymer (EEA). More preferably the ethylene alkyl (meth)acrylate copolymer is a copolymer of ethylene and methyl acrylate.

The ethylene alkyl (meth)acrylate copolymer may contain about 5 to about 30 wt %, preferably about 10 to about 25 wt % of the residues of the alkyl (meth)acrylate monomer, based on the total weight of the ethylene alkyl (meth)acrylate copolymer.

Suitable ethylene alkyl (meth)acrylate copolymers have a melt index (MI) ranging from about 7 to 30 g/10 min, preferably from about 15 to about 25 g/10 min, and more preferably about 20 g/10 min. The melt index is measured at 190° C./2.16 kg according to ASTM D1238.

Suitable copolymers of ethylene and alkyl (meth)acrylate may be produced by "tubular reactor technology" in a continuous flow reactor rather than via the conventional autoclave technology. So-called "tubular E/AA" is characterized by longer chain branching and a narrower molecular weight distribution (MWD) compared to autoclave-produced E/AA. As a result, tubular E/AA can sustain high melt strengths even at melt index values of about 20 g/10 min. Thus, the processing advantages of a relatively high melt index and the good foamability resulting from high melt strength values are simultaneously obtained without using a plasticizer. As noted above, this feature minimizes the problem of fogging, and results in a simpler and more economical formulation.

Suitable ethylene alkyl (meth)acrylate copolymers also have a broad chemical composition distribution (CCD) as determined by interaction polymer chromatography (IPC). This technique and the information it yields are described at length below. Without wishing to be held to any theory, it is believed that high melt strength values, i.e., the high viscosity at low shear that is necessary for good foaming, result from the selection of an ethylene alkyl (meth)acrylate with a broad chemical composition distribution.

The foamable composition of the invention comprises at least about 50 wt %, preferably about 60 to about 90 wt %, and more preferably about 75 to about 85 wt % of the ethylene alkyl (meth)acrylate copolymer(s), based on the total weight of the foamable composition.

The foamable composition also includes one or more polyolefins having a carboxylic acid or carboxylic acid anhydride functionality, also referred to herein as "ethylene acid copolymers". In general, these polyolefin(s) contribute to the good adhesion of the foamed composition to metal. Preferably, the olefin comprises ethylene, and, more preferably, the olefin consists essentially of ethylene; however, the polyolefin(s) may contain the residue of one or more other alpha olefins, such as propene, butene, or octene, for example. Preferably, the polyolefin(s) comprise vinyl acetate and/or one or more alkyl (meth)acrylate(s). The total amount of vinyl acetate and alkyl (meth)acrylate(s) in the polyolefin(s) is preferably in the range between about 5 and about 35 wt %, more preferably between about 20 and about 30 wt % of the total weight of the polyolefin having a carboxylic acid or carboxylic acid anhydride functionality.

The carboxylic acid or carboxylic acid anhydride functionality may be the residue of a comonomer that is copolymerized in the polyolefin chain, or it may be a residue that is grafted onto the polyolefin chain, or a combination of residues derived from both grafting and copolymerization. The ethylene acid copolymer may include about 0.2 to about 15 wt % of carboxylic acid and/or maleic anhydride residues, based on the total weight of the ethylene acid copolymer.

The foamable composition of the invention comprises from about 2 to about 40 wt %, and preferably from about 7 to about 15 wt % of the ethylene acid copolymer(s), based on the total weight of the foamable composition.

The polyolefin(s) having a carboxylic acid or carboxylic acid anhydride functionality may advantageously include about 0.5 to about 1.5 wt % of one or more tackifiers, based on the total weight of the foamable composition. Suitable tackifiers include, without limitation, aromatic hydrocarbon resins. The tackifier preferably causes the outer surface of the foamable composition to become sticky when it is subjected to an elevated temperature sufficient to accomplish the foaming process. Tackifiers having a higher molecular weight, such as aromatic hydrocarbon resins, are preferred, because they also minimize the tendency of the foam towards fogging.

The foamable composition further includes one or more foaming agents or "blowing agents". Suitable foaming agents include, for example, benzene sulfonyl hydrazide, azodicarbonamide and p-toluene sulfonyl hydrazide. The foaming agents can be formulated from a selected agent or a combination of agents depending upon the degree of expansion desired for a particular application, the required cell structure and the baking profile for the foaming operation. Preferably, the choice of the foaming agent and its level are such that the volume of the resulting foam is from about 100% to about 1500% greater than the volume of the foamable composition. An inorganic additive that reduces the temperature of activation of the foaming agent, such as zinc oxide, may also be included in the foamable composition.

The foamable composition of the invention comprises from about 1 to about 10 wt %, and preferably from about 2 to about 10 wt % of the foaming agent(s), based on the total weight of the foamable composition.

The foamable composition also includes one or more crosslinking agents, typically peroxy based crosslinking agents which include, for example, p-toluene sulfonyl hydrazide; p-toluene sulfonyl semicarbazide; 4,4-di-tert-butyl-peroxy-n-butyl-valereate; 1,1-d i-tert-butyl-peroxy-3,3, 5trimethylcyclohexane and bis(tert-butyl-peroxy-isopropyl) benzene. These crosslinking agents promote the formation of a closed cell foam.

The foamable composition of the invention comprises from about 1 to about 5 wt %, and preferably from about 2 to about 4 wt % of the crosslinking agent(s), based on the total weight of the foamable composition.

The composition may optionally include inorganic fillers, usually in an amount up to 20 wt %. The inorganic fillers may be nucleating agents, or they may enhanced the stiffness to the composition, for example.

The foamable composition of the invention does not require, and preferably omits, any organic additives, such as plasticizers, that would become residual volatile organic components in the resulting foam.

In addition to the foamable composition itself, the invention also provides an article comprising the foamable composition of the invention or a foam obtainable by foaming the composition of the invention. In some preferred embodiments, the non-foamable support defines a cavity, and at least a portion of the foamable composition or of the foam obtainable by foaming the composition is inside the cavity. In some particularly preferred embodiments, the non-foamable part is a car pillar. The cavity may be substantially filled by the foam. Alternatively, one or more openings in the non-foamable support may be filled or sealed with the foam. In this embodiment, the foam acts as a seal or plug; perhaps only a relatively small amount of the foam will extend inside the cavity. Automobile bodies may include one or more of these seals, which are referred to as "auto body plugs."

Methods of molding the foamable composition, or otherwise forming and placing it, and methods of foaming in place will be known to those of skill in the art. Injection molding is a preferred method of forming the foamable composition. Preferably, the foams are obtained by heating the foamable composition at or above the temperature at which the one or more foaming agents become active. More preferably, for increased efficiency, the heating step for the foaming process is combined with another process, such as a heating step that cures the coating on an automobile. It is apparent that the choice of foaming agent(s) will then depend largely on the temperature at which the coating must be cured. For example, if a coating is cured at a temperature of approximately 160° C., the activation temperature of the foaming agent(s) is preferably about 150° C.

Determination of the Chemical Composition Heterogeneity

As is noted above, the ethylene-alkyl (meth)acrylate copolymer has a broad chemical composition distribution with standard deviation $\sigma > 0.1$ as determined by interaction polymer chromatography (IPC). As used herein, the term "chemical composition distribution", which may be abbreviated "CCD", refers to a mass distribution of macromolecules containing different amounts of alkyl (meth)acrylate in their polymer chains. The width of the chemical composition distribution determines the degree of chemical composition heterogeneity (CCH) of copolymer and can be characterized by standard deviation $\sigma$ of this distribution according to equation (1):

$$\sigma = [\Sigma C_i (\xi_i - \xi_{av})^2]^{1/2} \quad (1)$$

where $\xi_i$ is the chemical composition of fraction i, in the case of E/AA copolymers, $\xi_i$ being expressed as the mass fraction of the alkyl (meth)acrylate comonomer in the copolymer chain of fraction i, so that all chains from fraction i have the same composition;

$C_i$ is the normalized mass concentration of fraction i; and $\xi_{av}$ is the overall average chemical composition of the copolymer, in the case of E/AA copolymers, $\xi_{av}$ being expressed as the average mass fraction of the alkyl (meth) acrylate comonomer in the overall copolymer chain.

It is noted that the following equations (2) and (3) hold according to the aforementioned definition:

$$1 = \Sigma C_i \quad (2)$$

$$\epsilon_{av} = \Sigma C_i \xi_i \quad (3)$$

The standard deviation, $\sigma$, in equation (1) may vary from 0 for homopolymers to 0.5 in case of a blend of two different homopolymers, for example 50/50 wt % blend of polyethylene and poly(alkyl (meth)acrylate). The width of chemical composition distribution for a copolymer is always between these boundary values of $\sigma$. Copolymers with a narrow chemical composition distribution are characterized by $\sigma$-values below 0.1, preferably below 0.05. On the other hand, for copolymers with a broad chemical composition distribution, the standard deviation $\sigma$ is greater than 0.1, and preferably is greater than 0.15.

A novel technique called interaction polymer chromatography (IPC) has been used to characterize E/AA copolymers by their degree of chemical composition heterogeneity. This technique is a branch of high performance liquid chromatography (HPLC) of polymers. It is designed to separate macromolecules by their chemical composition, their primary microstructure, their end-groups and other molecular properties exclusive of molecular weight. As a result, the measurement of distributions of macromolecules by, for example, their chemical composition can be achieved. Interaction polymer chromatography is a method complementary to the size exclusion chromatography (SEC) technique which is routinely used for determination of the molecular weight distribution (MWD) of polymers. In interaction polymer chromatography, a non-steric interaction, for example the adsorption between the macromolecules and the stationary phase, plays a dominant role in polymer retention. In size exclusion chromatography, such non-steric interactions are suppressed, and the retention is determined exclusively by the steric interaction of macromolecules with the internal surface of the particles.

There is a special mode in interaction polymer chromatography, the "critical point of adsorption" (CPA), wherein the composition of a mobile phase is such that steric and non-steric interactions completely compensate each other and a molecular weight-independent elution can be achieved. The isocratic elution at CPA has been used in prior art for characterization of molecular structure of functional oligomers and block-copolymers.

A new IPC method, gradient elution at critical point of adsorption (CPA), has recently been developed by Y. Brun et al (Y. Brun, J. Liq. Chrom. & Rel. Technol., 22, 3067-3090 (1999)). This method is specifically designed to characterize copolymers, including ethylene-alkyl (meth)acrylate copolymers, by their chemical composition heterogeneity. The critical point of adsorption does not depend on the molecular weight of a given macromolecule, but rather is related exclusively to its chemical composition and primary microstructure. The critical point of adsorption is determined by the chemical composition, specifically, in the case of ethylene-alkyl (meth)acrylate copolymers, by the molar fraction or weight fraction of (meth)acrylate in the polymer chain.

When copolymers are subjected to gradient elution at the critical point of adsorption, molecular weight-independent separation based on chemical composition of macromolecules is achieved, so that each slice of the IPC chromatogram represents a fraction of macromolecules with a specific chemical composition. A copolymer with a broad CCD (high CCH, $\sigma > 0.1$) is characterized by a broad IPC chromatogram (elution profile), while a chemically homogeneous copolymer (narrow CCD, $\sigma < 0.1$) including just a few fractions with close chemical compositions, is represented by a narrow IPC chromatogram. Stated alternatively, the width of an IPC chromatogram is a quantitative measure of the CCH of a copolymer. This width can be measured by the volume (in ml) of the eluent passing through a chromatographic column between a lift-off and touch-down of the polymer peak. It is to be emphasized that the width of an IPC chromatogram does not depend on the molecular weight distribution (MWD) of a copolymer, but rather it is a measurement of the CCH of a copolymer. It is also noted in passing that, while the standard deviation $\sigma$ of the CCD is an intrinsic property of the polymer sample, the width of the IPC chromatogram (in ml) depends on the specific chromatographic method and the conditions selected for the IPC separation.

It has been found that E/AA copolymers obtained from tubular reactors have a narrow MWD and a broad CCD ($\sigma > 0.1$), so that they are characterized by narrow SEC chromatograms and broad IPC chromatograms. Y. Brun, J. Liq. Chrom. & Rel. Technol., 22, 3067-3090 (1999). In contrast, E/AA copolymers obtained from autoclave reactors have a broad MWD, indicated by broad SEC chromatograms, and a narrow CCD ($\sigma < 0.05$), indicated by narrow IPC chromatograms.

FIG. 1 represents the elution profiles for two ethylene-methyl acrylate (EMA) copolymers:

Copolymer (1) was obtained from an autoclave reactor MI=1; MA content (wt %)=24.5; melting point (° C.) 73; heat of fusion (J/g)=40; and Copolymer (2) was obtained from a tubular reactor MI=1; MA content (wt %)=25; melting point (° C.) 85; heat of fusion (J/g)=37.

Figure 2:
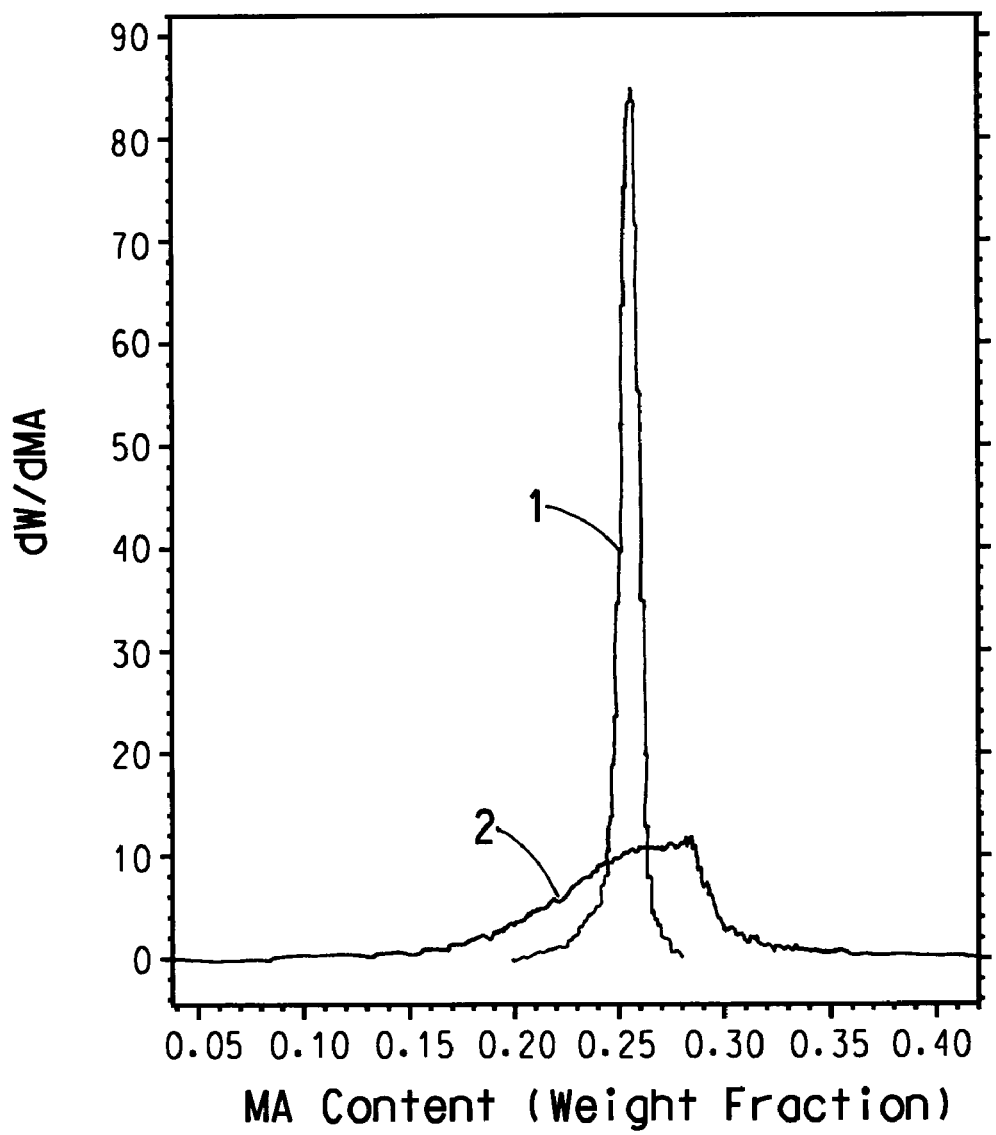
FIG. 2 is a graph illustrating the chemical composition distribution (CCD) of two grades of ethylene methyl acrylate (EMA) copolymers.

Both polymers had very close average chemical composition ($\xi_{av}$=0.245 and 0.250 respectively), but a much broader peak was associated with product (2) (width: 6 ml for product (2) and 1 ml for product (1)), thus indicating a significantly higher CCH of the EMA obtained from a tubular reactor. For a quantitative estimation, these chromatograms were converted into CCD curves representing a normalized concentration C of the separated fractions as a function of their chemical composition $\xi$ (mass fraction of MA). These curves are depicted in FIG. 2. A chemical composition calibration curve was constructed using apexes of elution profiles of several available copolymers having chemical compositions 19-35 wt % MA, all of which were synthesized in an autoclave reactor. This calibration curve was obtained by means similar to those used in SEC for constructing a molecular weight calibration curve from a set of narrow polydispersity standards.

Still referring to FIG. 2, curve 1 is a typical curve for an EMA copolymer of a given composition produced in an autoclave reactor. Curve 2 is a typical curve for an EMA copolymer of the same composition produced in a tubular reactor. The autoclave-produced EMA has a sharp curve 1 representing a very narrow CCD with calculated standard deviation $\sigma$=0.043, whereas the tubular reactor-produced EMA has a very flat curve 2 representing a very broad CCD with standard deviation $\sigma$=0.14.

The following example is provided to describe the invention in further detail. This example, which sets forth a preferred mode presently contemplated for carrying out the invention, is intended to illustrate and not to limit the invention.

EXAMPLE

A foamable composition according to the invention was prepared from the components A through H, in the amounts listed in Table I.

TABLE I

| | Composition | Trade Name | Trade Source | Concentration [wt %] |
|---|---|---|---|---|
| A | E/MA - Base Polymer | ELVALOY ® AC 12024 | DuPont | 81.67 |
| B | EVA polymer with grafted maleic anhydride (MAH) | FUSABOND ® MC250D | DuPont | 9.07 |
| C | Tackifier | Unilene A100 | Petroquimica Uniao Brasil | 0.91 |
| D | Dicumyl Peroxide containing 40 wt % of inert fillers (clay) | Perkadox BC-40B-pd | Akzo | 0.45 |
| E | Di(tert-butylperoxy-isopropyl)benzene, powder, with inert fillers (clay) | Perkadox 14-40K-pd | Akzo | 1.72 |
| F | Azodicarbonamide | Luvopor ® ABF/70 P-FF | Lehmann & Voss & Co | 5.44 |
| G | OBSH (4,4'-Oxibis(benzenesulfonyl-hydrazide)) | Luvopor ® OB Pulver | Lehmann & Voss & Co | 0.36 |
| H | ZnO | Zinc oxide | Lehmann & Voss & Co | 0.36 |

Component A is a basic copolymer comprising ethylene and an alkyl acrylate, specifically EMA containing 76 wt % ethylene and 24 wt % methyl acrylate. Compound A has a broad CCH as determined by IPC ($\sigma$=0.16). It also has a melt index (MI) of 20 g/10 min measured at 190° C./2.16 kg according to ASTM D1238.

Component B is a polyolefin having a carboxylic acid or carboxylic acid anhydride functionality, specifically ethylene vinyl acetate with grafted maleic anhydride (MAH), containing 28 wt % vinyl acetate and 1.5 wt % grafted MAH. This component is believed to enhance the adhesion of the foamed product to metals.

Component C is a hydrocarbon resin tackifier that improves the adhesion further.

Components D and E are peroxide crosslinking agents that promote the production of a closed cell foam.

Components F and G are foaming agents, and Component H is an inorganic foaming agent additive that tends to reduce the activation temperature of the foaming agents.

Notably, the exemplified composition of the invention does not contain a plasticizer that is liable to produce volatile organic residues in the foam.

Since the foaming agents D and E become reactive at about 130° C., and the melting point of the base polymer A is about 85 to 90° C., the processing temperatures must be controlled strictly within this relatively narrow range.

Pre-mixing. Two premixes were prepared, one including polymers A, B, C, and a second including powders D, E, F, G, H. The polymers were added by a gravimetric feeder. The powder components D, E, F, G and H were added via a gravimetric feeder and a single screw extruder. The polymer components A, B, C were in the form of pellets that were mixed with a Henschel mixer. The powder components D, E, F, G and H were also mixed with the Henschel mixer until homogeneity was achieved. Mixing all components in one single masterbatch per lot avoided concentration variations of the individual components.

Compounding. A blended compound was produced from the pre-mix on a co-rotating twin-screw extruder with a screw design, such as is used for the compounding of shear sensitive colour masterbatches. This type of equipment is well known to those skilled in the art. The screw speed was adjusted so as to maintain the melt temperature of the blended compound below the activation temperature of the peroxide crosslinking agents, i.e. below about 140° C. Optionally, compounding can be followed by extrusion to an underwater pellet cutting system, with or without cutting the extrudate, in order to reduce its temperature rapidly. Heating and cooling were provided by the extruder. The temperature profile started at about 25° C. and ranged up to about 110 or 125° C. The melt temperature of the blended compound was maintained below 140° C.

Molding. After compounding, each lot was dried in a mechanical blender, then homogenized. The homogenized compound was then processed by injection molding in a SG Automat Arburg Allrounder injection molding machine with a single cavity to produce molded plaques. As during compounding, the pressure and rotational speed of the injection molding machine were adjusted to maintain the melt temperature of the homogenized compound below the activation or "kick off" temperature of the peroxide crosslinking agents. Likewise, the injection speed was adjusted to the molded pieces and minimized in order to avoid overheating through heat created by an excessive shear rate. "Hold up time" at molding temperature was also minimized to avoid premature foaming. The mold itself was cooled to room temperature or lower. The temperature profile of injection was between 25° C. in the feeding zone up to 125° C. in the die. After completion of the molding cycle, the machine was purged with pure component A.

Preparation of Samples. The resulting injection molded plaques of the given composition measured approximately 55×65×3 mm. These plaques were first cut into smaller plaques measuring 20×20×3 mm, which were then glued together three-by-three using cyanacrylate glue to form rectangular bodies ("blocks") measuring 20×20×9 mm. These blocks constitute samples of foamable parts that were subjected to foaming tests. For testing, the sample blocks were placed on household baking paper.

Foaming tests and results. Testing was carried out by placing the blocks in the centre of a circulating air oven and heating the blocks at the temperatures and for the times set forth in Table I, below. Temperature control was +/−1.5° C. The initial volume of each block was calculated from measurements of its dimensions to an accuracy of 0.01 mm. The final volume after foaming was determined by volume displacement. The foamed samples were immersed in distilled water containing a few droplets of detergent. The expansion percentage was calculated as the volume of the block after foaming divided by the volume of the block before foaming, for each specified temperature and after each specified time. Table II shows the expansion percentage as a function of temperature and time (in minutes).

TABLE II

| | Temp | | | | | | |
|---|---|---|---|---|---|---|---|
| Time | 125° C. | 135° C. | 145° C. | 155° C. | 165° C. | 175° C. | 185° C. |
| 0' | 0% | 0% | 0% | 0% | 0% | 0% | 0% |
| 10' | 0% | 0% | 0% | 0% | 3% | 81% | 343% |
| 15' | 0% | 4% | 10% | 133% | 440% | 479% | 415% |
| 20' | 0% | 4% | 10% | 133% | 440% | 479% | 415% |
| 25' | 0% | 6% | 50% | 286% | 447% | 470% | 366% |

The results reported in Table II show that the blocks demonstrated good foaming. The foamable composition had excellent foaming properties over a broad temperature range. It was based on polymers that are economically feasible for use in the envisaged applications. Moreover, the foamable composition contained no plasticizer that would leave a residue of volatile organic components (VOC), thus avoiding undesirable "fogging".

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A foamable composition consisting essentially of:
   (i) at least 50 wt % of at least one copolymer of ethylene and alkyl (meth)acrylate having a broad chemical composition distribution with a standard deviation σ>0.1 as determined by interaction polymer chromatography, and having a melt index between about 15 and about 25 g/10 min, measured at 190° C. and 2.16 kg according to ASTM D1238;
   (ii) from about 2 to about 40 wt % of at least one polyolefin; said polyolefin consisting essentially of copolymerized residues of ethylene and one or more comonomers comprising a carboxylic and functionality or a carboxylic acid anhydride functionality, and, optionally, copolymerized residues of one or more of a second alpha-olefin, vinyl acetate, and an alkyl (meth)acrylate; and said polyolefin optionally further comprising about 0.5 to about 1.5 wt % of one or more tackifiers;
   (iii) from about 1 to about 10 wt % of one or more foaming agents; and
   (iv) from about 1 to about 5 wt % of one or more crosslinking agents;
   wherein the weight percentages are based on the total weight of the foamable composition; optionally,
   (v) a tackifier consisting of an aromatic hydrocarbon resin; and optionally,
   (vi) up to 20 wt % of one or more inorganic fillers.

2. The foamable composition of claim 1, consisting essentially of:
   (i) about 60 to about 90 wt % of the copolymer of ethylene and alkyl (meth)acrylate;
   (ii) about 7 to about 15 wt % of the polyolefin having a carboxylic acid or carboxylic acid anhydride functionality;

(iii) about 2 to about 10 wt % of the one or more foaming agents; and
(iv) about 2 to about 4 wt % of the one or more crosslinking agents; optionally,
(v) the tackifier; and, optionally,
(vi) the one or more inorganic fillers.

3. The foamable composition of claim 2, comprising about 75 to about 85 wt % of the copolymer of ethylene and alkyl (meth)acrylate and from about 7 to about 15 wt % of the polyolefin.

4. The foamable composition of claim 1 wherein the copolymer of ethylene and alkyl (meth)acrylate is selected from the group consisting of ethylene methyl acrylate copolymer, ethylene butyl acrylate copolymer, and ethylene ethyl acrylate copolymer.

5. The foamable composition of claim 1 wherein the copolymer of ethylene and alkyl (meth)acrylate contains from about 5 to about 30 wt % of the alkyl (meth)acrylate, based on the total weight of the ethylene alkyl (meth)acrylate copolymer.

6. The foamable composition of claim 1 wherein the polyolefin chain having a carboxylic acid or carboxylic acid anhydride functionality is a copolymer of ethylene and vinyl acetate.

7. The foamable composition of claim 6 wherein the polyolefin having a carboxylic acid or carboxylic acid anhydride functionality comprises between 0.2 and 15 wt % of residues of a carboxylic acid, maleic anhydride, or both a carboxylic acid and maleic anhydride, based on the total weight of the polyolefin.

8. The foamable composition of claim 1 wherein the one or more foaming agents comprise at least one of benzene sulfonyl hydrazide, azodicarbonamide and p-toluene sulfonyl hydrazide.

9. The foamable composition of claim 1 wherein the one or more crosslinking agents are peroxy-based crosslinking agents.

10. The foamable composition of claim 1 wherein the melt index of the copolymer of ethylene and alkyl (meth)acrylate is about 20 g/10 min.

11. An article comprising the foamable composition of claim 1 or a foam obtainable by foaming the composition of claim 1.

12. The article of claim 11, further comprising a non-foamable support.

13. The article of claim 12, wherein the non-foamable support defines a cavity, and at least a portion of the foamable composition or of the foam obtainable by foaming the composition is inside the cavity.

14. The article of claim 13, wherein the non-foamable support is a car pillar.

15. The article of claim 13, further comprising an auto body plug.

* * * * *